(12) United States Patent
Bradenburg

(10) Patent No.: US 10,016,957 B2
(45) Date of Patent: *Jul. 10, 2018

(54) SOLID-PHASE COMPOSITE STRUCTURE AND RELATED METHODS

(71) Applicant: Seaman Corporation, Wooster, OH (US)

(72) Inventor: Frank Bradenburg, Wooster, OH (US)

(73) Assignee: Seaman Corporation, Wooster, OH (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/050,853

(22) Filed: Feb. 23, 2016

(65) Prior Publication Data

US 2017/0129810 A1    May 11, 2017

Related U.S. Application Data

(60) Provisional application No. 62/252,705, filed on Nov. 9, 2015.

(51) Int. Cl.
*C04B 16/06* (2006.01)
*B32B 27/32* (2006.01)
(Continued)

(52) U.S. Cl.
CPC ............ *B32B 13/02* (2013.01); *B32B 5/022* (2013.01); *B32B 5/024* (2013.01); *B32B 7/12* (2013.01);
(Continued)

(58) Field of Classification Search
CPC ............ B32B 13/02; B32B 2262/0253; B32B 2315/06; B32B 7/12; B32B 27/32;
(Continued)

(56) References Cited

U.S. PATENT DOCUMENTS 5,580,630 A    12/1996    Byrd
5,584,950 A    12/1996    Gaffigan
(Continued)

OTHER PUBLICATIONS

Product web-page for Sure-Grip®, a concrete liner manufactured by Agru; electronically published in 2014.
Product web-page for T-Lock, a PVC liner manufactured by Ameron International Protective Lining Products; electronically published in 2004.

*Primary Examiner* — Camie S Thompson
(74) *Attorney, Agent, or Firm* — Black, McCuskey, Souers & Arbaugh, LPA

(57) ABSTRACT

A composite structure having a solid-phase concrete base-substrate component; a fibrous component that is a plurality of polypropylene fibers, at least a portion of which are embedded into and thereby mechanically attached to the solid-phase concrete base-substrate component, wherein at least a portion of the fibers extend from within the concrete base-substrate component and out of the concrete base-substrate component through an exterior surface of the concrete base-substrate component; and a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-containing-alloy exterior sheet.

4 Claims, 2 Drawing Sheets

(51) Int. Cl.
  *B32B 13/02* (2006.01)
  *B32B 27/12* (2006.01)
  *B32B 27/30* (2006.01)
  *B32B 7/12* (2006.01)
  *B32B 5/02* (2006.01)
  *B32B 13/14* (2006.01)
  *B32B 27/36* (2006.01)
  *B32B 27/08* (2006.01)

(52) U.S. Cl.
  CPC .............. *B32B 13/14* (2013.01); *B32B 27/08* (2013.01); *B32B 27/12* (2013.01); *B32B 27/304* (2013.01); *B32B 27/32* (2013.01); *B32B 27/36* (2013.01); *C04B 16/0633* (2013.01); *B32B 2250/04* (2013.01); *B32B 2262/0253* (2013.01); *B32B 2262/0276* (2013.01); *B32B 2305/08* (2013.01); *B32B 2307/7265* (2013.01); *B32B 2315/06* (2013.01)

(58) Field of Classification Search
  CPC ............... B32B 13/14; B32B 2250/04; B32B 2262/0276; B32B 27/08; B32B 27/12; B32B 27/36; B32B 5/024; C04B 16/0633
  See application file for complete search history.

(56) References Cited

U.S. PATENT DOCUMENTS

| | | | |
|---|---|---|---|
| 6,630,231 B2 | 10/2003 | Perez et al. | |
| 6,960,394 B2 | 11/2005 | Graham et al. | |
| 7,686,903 B2 | 3/2010 | Muncaster et al. | |
| 7,882,671 B2 | 2/2011 | Bruce et al. | |
| 8,147,644 B2 | 4/2012 | Tippins | |
| 8,413,406 B2 | 4/2013 | Doerken | |
| 8,512,838 B2 | 8/2013 | Zhang et al. | |
| 8,715,819 B2 | 5/2014 | Gencer et al. | |
| 8,793,862 B2 | 8/2014 | Weber et al. | |
| 2003/0145546 A1* | 8/2003 | Georgeau | E04D 5/12 52/408 |
| 2007/0130864 A1* | 6/2007 | Semmens | E04D 7/00 52/408 |
| 2009/0123687 A1 | 5/2009 | Chakraborty et al. | |
| 2012/0313307 A1 | 12/2012 | Cartwright et al. | |
| 2013/0247490 A1 | 9/2013 | Strait | |
| 2015/0052847 A1 | 2/2015 | Wiercinski et al. | |
| 2015/0231863 A1 | 8/2015 | Knebel et al. | |
| 2015/0352804 A1* | 12/2015 | Kohlman | B32B 27/32 428/159 |
| 2017/0129211 A1* | 5/2017 | Bradenburg | B32B 13/02 |

\* cited by examiner

SOLID-PHASE COMPOSITE STRUCTURE AND RELATED METHODS

CROSS-REFERENCE TO RELATED APPLICATIONS

This patent application claims priority to U.S. provisional patent application Ser. No. 62/252,705 filed on Nov. 9, 2015, and the subject matter of U.S. provisional patent application Ser. No. 62/252,705 is hereby incorporated by reference into this application.

BACKGROUND OF THE INVENTION

Waterproofing technologies for solid-phase concrete are known and include post treatment of a solid-phase concrete surface with at least a liquid-applied coating or paint. A need remains for additional concrete solid-phase substrate waterproofing technologies.

BRIEF SUMMARY OF THE INVENTION

A composite structure having a solid-phase concrete base-substrate component; a fibrous component that is a plurality of polypropylene fibers, at least a portion of which are embedded into and thereby mechanically attached to the solid-phase concrete base-substrate component, wherein at least a portion of the fibers extend from within the concrete base-substrate component and out of the concrete base-substrate component through an exterior surface of the concrete base-substrate component; and a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-containing-alloy exterior sheet.

A composite structure having a solid-phase base-substrate component; a fibrous component that is a plurality of fibers, at least a portion of which are embedded into and thereby mechanically attached to the solid-phase base-substrate component, wherein at least a portion of the fibers extend from within the base-substrate component and out of the base-substrate component through an exterior surface of the base-substrate component; and an adhesive layer component having a first and second surface, wherein the adhesive layer component first surface is in contact with and adhesively attached to the fibrous component, and wherein the adhesive layer second surface is in contact with and adhesively attached to a first surface of an exterior sheet.

A method having the step of applying liquid-phase concrete to a first surface of a fibrous component of a composite structure, wherein the composite structure has: a fibrous component that is a plurality of fibers, wherein the fibrous component has a first surface and a second surface; and an adhesive-layer component having a first and second surface, wherein the adhesive-layer component first surface is in contact with and adhesively attached to a fibrous component second surface, and wherein the adhesive layer second surface is in contact with and adhesively attached to a first surface of an exterior sheet.

A composite structure having a solid-phase concrete base-substrate component; a fibrous component that is a plurality of polypropylene fibers, at least a portion of which are embedded into and thereby mechanically attached to the solid-phase concrete base-substrate component, wherein at least a portion of the fibers extend from within the concrete base-substrate component and out of the concrete base-substrate component through an exterior surface of the concrete base-substrate component; and a polyvinylchloride or polyvinylchloride-alloy exterior sheet that is mechanically attached to the solid-phase concrete base-substrate component by at least a portion of the fibers that are extending out of the concrete base-substrate component and that are also embedded within the polyvinylchloride or polyvinylchloride-alloy exterior sheet.

A composite structure having a solid-phase base-substrate component; a fibrous component that is a plurality of fibers, at least a portion of which are embedded into and thereby mechanically attached to the solid-phase base-substrate component, wherein at least a portion of the fibers extend from within the base-substrate component and out of the solid-phase base-substrate component through an exterior surface of the solid-phase base-substrate component; an exterior sheet that is mechanically attached to the solid-phase base-substrate component by at least a portion of the fibers that are extending out of the base-substrate component and that are also embedded within the exterior sheet.

A method having the step of applying liquid-phase concrete to a first surface of a fibrous component of a composite structure, wherein the composite structure has: a fibrous component that is a plurality of fibers, wherein the fibrous component has a first surface and a second surface; and wherein at least a portion of the second-surface fibers are embedded into an exterior sheet.

BRIEF DESCRIPTION OF THE SEVERAL VIEWS OF THE DRAWING(S)

DETAILED DESCRIPTION OF THE INVENTION

Figure 1:
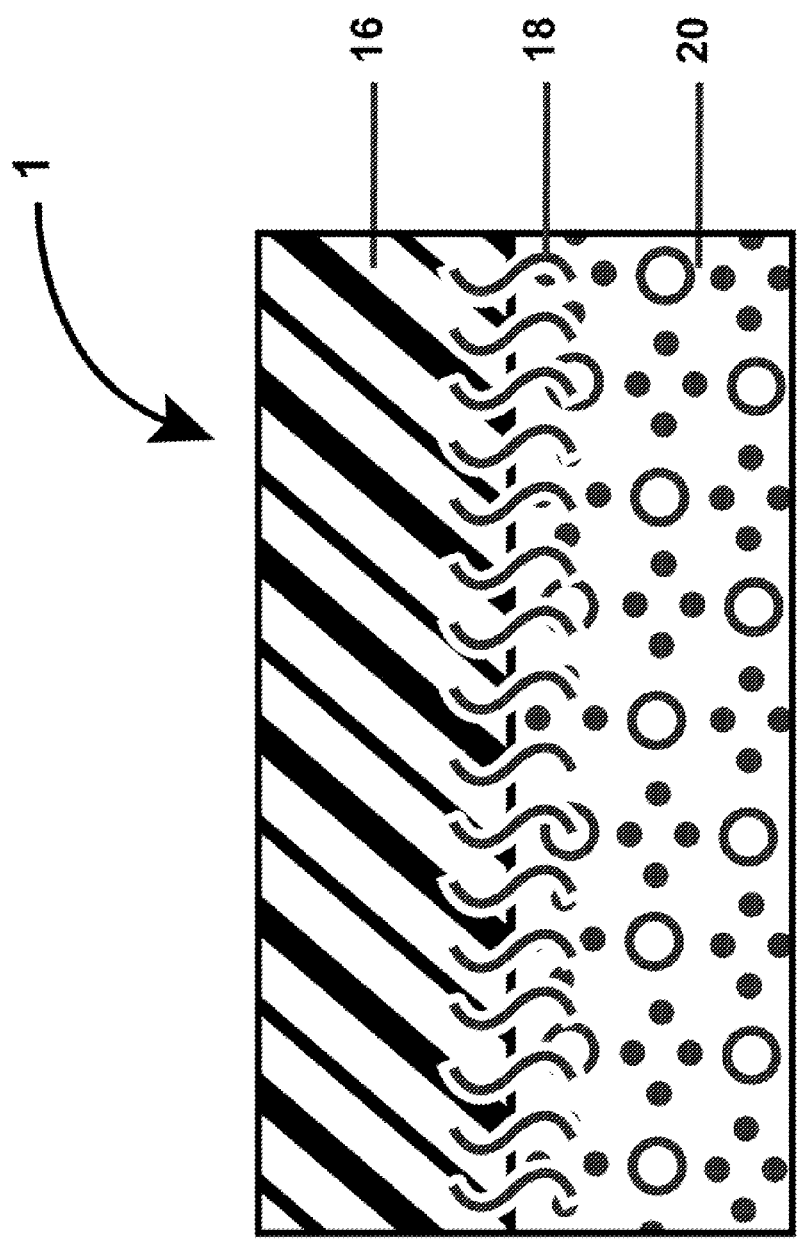
FIG. 1 is a schematic showing a solid-phase composite-structure embodiment.
Figure 2:
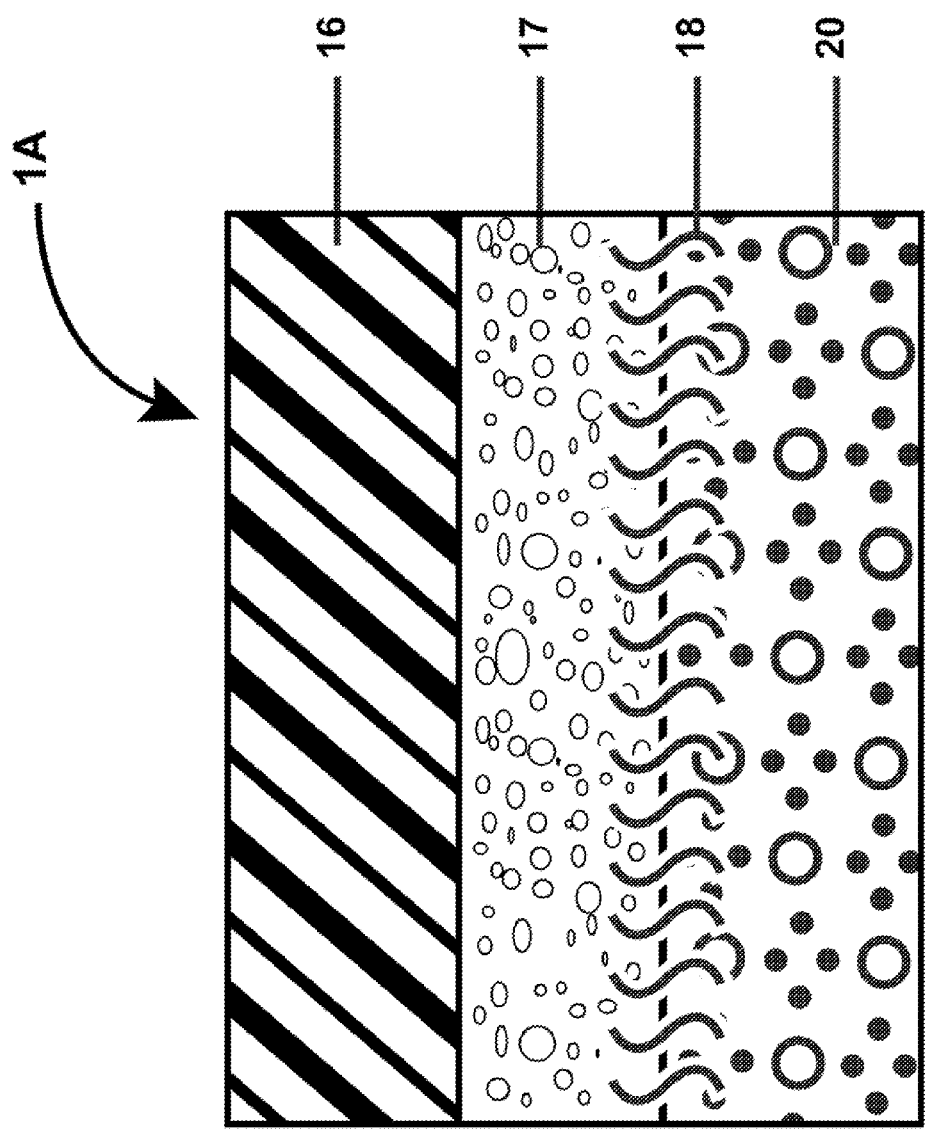
FIG. 2 is a schematic showing a solid-phase composite-structure embodiment.

With reference to FIGS. 1 and 2, respectively provided are solid-phase composite-structure embodiments 1 and 1A. FIG. 1 is a schematic that shows solid-phase composite structure 1 having solid-phase base-substrate component 20, fibrous component 18, and exterior-sheet component 16. FIG. 2 is a schematic that shows solid-phase composite structure 1A having solid-phase base-substrate component 20, fibrous component 18, adhesive-layer component 17, and exterior-sheet component 16.

Again, with reference to the Figures, embodiments are generally directed to pre-cast or cast-in-place solid-phase composite structure(s) 1 and 1A having components directly or indirectly mechanically attached to at least one side or surface of solid-phase base-substrate component 20 via fibrous component 18 that is at least partially embedded into the fixed matrix of solid-phase base-substrate component 20. The above-mentioned terms "pre-cast" and "cast-in-place" generally describe when and where the solid-phase composite structure is manufactured. "Pre-cast" solid-phase composite structures 1 and 1A are prefabricated at a first manufacturing location and then subsequently shipped to a second location for use. On the other hand, "cast-in-place" solid-phase composite structures are manufactured in the field and on location; in other words, they are not prefabricated. "Direct mechanical attachment" is a term that describes first and second solid-phase composite-structure components that are immediately adjacent to each other and also mechanically or adhesively attached to one another. "Indirect mechanical attachment," is a term that describes first and second solid-phase composite-structure components that are separated by at least one in-between or intermediate component that serves to attach the first and second components to one another.

Additional embodiments are directed to pre-cast or cast-in-place solid-phase composite structures having components directly or indirectly mechanically attached to at least two sides or surfaces of solid-phase base-substrate component 20 via at least one respective fibrous component 18 that is at least partially embedded therein. Other embodiments are directed to solid-phase composite structures 1 and 1A being pre-cast or cast-in-place concrete-based composite structures having non-concrete components directly or indirectly mechanically attached to at least one side or surface of concrete base-substrate component 20 via at least one respective fibrous component 18 that is at least partially embedded therein. Additional solid-phase composite-structure 1 and 1A embodiments are directed to pre-cast or cast-in-place concrete-based composite structures having non-concrete components directly or indirectly mechanically attached to at least two sides or surfaces of concrete base-substrate component 20 via fibrous component 18 that is at least partially embedded into the at least two sides or surfaces of the fixed matrix of base-substrate component 20.

Components

Solid-phase base-substrate component 20 is the substrate upon which all other components are directly or indirectly attached, and in embodiments, solid-phase base-substrate component 20 provides much of the strength and structural integrity to solid-phase composite-structure embodiments 1 and 1A. As a non-limiting example of a useful application for solid-phase composite-structure embodiments 1 and 1A, solid-phase composite structures 1 and 1A serve to provide the structural support that is commonly provided by a known poured-concrete home foundation or any other known solid-phase concrete structures that commonly need exterior-surface waterproofing. A person of ordinary skill in the art will be able to select additional useful solid-phase composite structure 1 and 1A applications without having to exercise undue experimentation. Useful solid-phase base-substrate component 20 materials include solid-phase concrete, solid-phase concrete-containing materials, solid-phase cement-containing materials, solid-phase materials having a fixed matrix, and combinations thereof.

In a first embodiment, and as shown in FIG. 1, fibrous component 18 is a plurality of non-woven fibers embedded into and thereby mechanically attached to the fixed matrixes of both solid-phase base-substrate component 20 and exterior-sheet component 16. In this embodiment, and by being embedded into the fixed matrixes of both solid-phase base-substrate component 20 and exterior-sheet component 16, fibrous component 18 mechanically and indirectly attaches solid-phase base-substrate component 20 to exterior-sheet component 16.

In a second embodiment, and as shown in FIG. 2, fibrous component 18 is a plurality of non-woven fibers adhered to adhesive-layer component 17 and also embedded into solid-phase base-substrate component 20. In an embodiment, each respective first end or portion of a plurality of fibers is adhered to adhesive-layer component 17 in a way that allows for a second end or portion of each respective fiber to extend away from adhesive-layer component 17 and into solid-phase base-substrate component 20. By being embedded into the fixed matrix of solid-phase base-substrate component 20, fibrous component 18 mechanically and indirectly attaches solid-phase base-substrate component 20 to adhesive-layer component 17. Known methods for applying non-woven fibers to an adhesive layer or other substrate can be used, and persons of ordinary skill in the art will be able to discover useful methods without having to exercise undue experimentation.

In manufacturing fibrous component 18, useful fibrous-component materials include non-polymeric fibers, polymeric fibers, polypropylene fibers, nylon fibers, fiberglass fibers, basalt fibers, and combinations thereof. Methods for manufacturing non-woven fibrous mats and non-woven fibrous substrates are well known, and persons of ordinary skill in the art will be able to select useful manufacturing methods without having to exercise undue experimentation.

In manufacturing adhesive-layer component 17, useful adhesive-layer-component materials include polyvinylchloride (PVC) adhesives, polyolefin adhesives, polyurethane adhesives, commercially known adhesives, and combinations thereof. Applying adhesives to substrates during manufacturing processes is well known, and persons of ordinary skill in the art will be able to select useful manufacturing methods for applying adhesives to substrates without having to exercise undue experimentation.

In embodiments, and as shown in FIG. 1, exterior-sheet component 16 is indirectly attached to solid-phase base-substrate component 20 via fibrous component 18. In other embodiments, and as shown in FIG. 2, exterior-sheet component 16 is indirectly attached to solid-phase base-substrate component 20 via fibrous component 18 and adhesive component 17. In embodiments, exterior-sheet-component manufacturing materials provide waterproofing-properties, salt-and-corrosion resistance, color, pattern, barnacle resistance, graffiti resistance, and combinations thereof to the overall composite structures 1 and 1A. Useful exterior-sheet-component materials include PVC, PVC alloys, polyvinylfluoride (PVF), polyvinylidene fluoride (PVDF), polypropylene, polypropylene alloys, polyolefin, polyolefin alloys, other known polymers, polymer alloys, and combinations thereof.

Manufacturing

As mentioned above, embodiments are directed to both pre-cast or cast-in-place solid-phase composite structures. In all pre-cast and cast-in-place solid-phase composite-structure embodiments, solid-phase composite structure 1 or 1A is manufactured using a step in which a liquid-phase base-substrate component is applied to or contacted with fibrous component 18. By contacting a liquid-phase base-substrate component with fibrous component 18, at least a portion of the plurality of fibers that make up fibrous component 18 penetrate into the liquid phase and remain there during the phase change or curing of the liquid phase into a solid phase. At the time of phase change, i.e., from liquid to solid, the plurality of fibers previously penetrated therein become mechanically attached to the solid phase from under the surface of the solid phase where the fibers are embedded therein and thereby mechanically attached to the solid-phase fixed matrix. In embodiments, the liquid-phase base-substrate material is poured onto at least a portion of fibrous component 18; as a non-limiting example, this is done by pouring liquid-phase base-substrate material into a mold wherein the interior cavity of the mold is defined by a plurality of fibers that make up fibrous component 18. In other embodiments, fibrous component 18 is applied to or rolled onto the top surface of the liquid-phase base-substrate material and then allowed to rest upon the liquid-phase surface as the fibers of fibrous component 18 penetrate into and beneath the surface of the liquid-phase base-substrate top surface; and as in the above embodiment, the fibers of fibrous component 18 remain there during the phase change or curing of the liquid phase into a solid phase. At the time of phase change, i.e., from liquid to solid, the plurality of fibers become mechanically attached to the solid-phase fixed matrix from under the surface of the solid phase where the fibers are embedded in and thereby mechanically attached to the solid-phase fixed matrix.

Known manufacturing methods and procedures can be used to manufacture solid-phase composite structures 1 and 1A, and in embodiments, solid-phase composite structures 1 and 1A are manufactured in steps. As a non-limiting example for manufacturing solid-phase composite structure 1, in a first step, fibrous component 18 is attached to solid-phase base substrate 20, and then in a second step, exterior-sheet component 16 is subsequently extruded onto the other side of fibrous component 18. In an additional manufacturing embodiment, the above-mentioned first and second steps are reversed, i.e., exterior-sheet component 16 is first extruded on a first side of fibrous component 18, and then solid-phase base substrate 20 is subsequently attached to the other side of fibrous component 18.

In a similar fashion to the method described immediately above regarding manufacturing solid-phase composite structure 1, manufacturing solid-phase composite structure 1A can employ steps that attach the components to one another in any reasonable sequence or manner, and persons of ordinary skill in the art will be able to determine useful manufacturing method sequences without having to exercise undue experimentation. As a non-limiting example, in a first manufacturing step directed to manufacturing solid-phase composite structure 1A, fibrous component 18 is attached to solid-phase base substrate 20; in a second manufacturing step, adhesive component 17 is then adhered or attached to fibrous component 18; and in a third manufacturing step, exterior-sheet component 16 is subsequently adhered to adhesive component 17, thereby completing manufacture of the four-component solid-phase composite structure 1A.

The liquid-phase base-substrate component is applied to or contacted with fibrous component 18 (of the intermediate membrane structure) and allowed to cure or change phases into the solid phase as described above-thereby creating solid-phase composite structure 1.

In another embodiment, solid-phase concrete composite structures 1 and 1A have improved tensile properties relative to concrete structures without surface elements attached thereto.

Persons of ordinary skill in the art will appreciate that embodiments beyond those specifically disclosed herein are within the scope of the invention.

What is claimed is:

1. A composite structure comprising:
   a solid-phase concrete base-substrate component;
   a fibrous component that is a plurality of polypropylene fibers, at least a portion of which are embedded into and thereby mechanically attached to the solid-phase concrete base-substrate component, wherein at least a portion of the fibers extend from within the concrete base-substrate component and out of the concrete base-substrate component through an exterior surface of the concrete base-substrate component; and
   a polyvinylchloride-adhesive layer component having a first and second surface, wherein the polyvinylchloride-adhesive layer component first surface is in contact with and adhesively attached to the fibrous component, and wherein the polyvinylchloride-adhesive layer second surface is in contact with and adhesively attached to a first surface of a polyvinylchloride or polyvinylchloride-containing-alloy exterior sheet.

2. The composite structure of claim 1, wherein the fibrous component is a plurality of non-woven fibers.

3. A composite structure comprising:
   a solid-phase concrete base-substrate component;
   a fibrous component that is a plurality of polypropylene fibers, at least a portion of which are embedded into and thereby mechanically attached to the solid-phase concrete base-substrate component, wherein at least a portion of the fibers extend from within the concrete base-substrate component and out of the concrete base-substrate component through an exterior surface of the concrete base-substrate component; and
   a polyvinylchloride or polyvinylchloride-alloy exterior sheet that is mechanically attached to the solid-phase concrete base-substrate component by at least a portion of the fibers that are extending out of the concrete base-substrate component and that are also embedded within the polyvinylchloride or polyvinylchloride-alloy exterior sheet.

4. The composite structure of claim 3, wherein the fibrous component is a plurality of non-woven fibers.

* * * * *